United States Patent
Li

[11] Patent Number: 5,900,703
[45] Date of Patent: May 4, 1999

[54] MOTOR CONTROL SYSTEM OF ELECTRICAL-MOTORIZED BICYCLE

[76] Inventor: Tsan Kuang Li, Fl. 5, No. 21, Ln 16, Sec. 2 Chung San N. Rd., Taipei, Taiwan

[21] Appl. No.: 08/792,856

[22] Filed: Jan. 23, 1997

[30] Foreign Application Priority Data

Feb. 7, 1996 [CN] China ............................ 96 1 18037.4

[51] Int. Cl.⁶ ................................................. H02K 7/00
[52] U.S. Cl. ............................ 318/2; 180/205; 180/171; 482/63; 482/903; 74/502.2
[58] Field of Search ................. 318/2; 180/205, 180/171; 482/63, 903; 74/302.2

[56] References Cited

U.S. PATENT DOCUMENTS

| | | | |
|---|---|---|---|
| 4,331,918 | 5/1982 | Dunch | 180/171 |
| 5,027,303 | 6/1991 | Witte | 482/903 |
| 5,324,242 | 6/1994 | Lo | 482/63 |
| 5,551,315 | 9/1996 | Pikoulas | 74/502.2 |
| 5,560,266 | 10/1996 | Shikimori et al. | 180/205 |

*Primary Examiner*—Karen Masih
*Attorney, Agent, or Firm*—Rosenberg, Klein & Bilker

[57] ABSTRACT

A motor control system for use in an electrical-motorized bicycle is disclosed. The motor control system includes a plurality of magnets arranged in a ring which is rotatable about the crank axle of the bicycle by the rotation of the chainwheel. A cover member is rotatably fit over the ring of the magnets and is fixed to the bicycle frame. At least two sensors are arranged on the cover member to detect the rotational speed and direction of the magnets and thus generating a signal to indicate the change of the rotational speed and direction of the chainwheel for controlling the operation of an electrical motor that is mechanically coupled to and drives the bicycle wheel so that only when the chainwheel is rotated in the direction to drive the bicycle forward, the motor is actuated to drive the bicycle wheel. Once the chainwheel stops, the motor is turned off and no torque is applied to the bicycle wheel.

4 Claims, 4 Drawing Sheets

MOTOR CONTROL SYSTEM OF ELECTRICAL-MOTORIZED BICYCLE

FIELD OF THE INVENTION

The present invention relates generally to an electrical-motorized bicycle and in particular to a motor control system of the electrical-motorized bicycle which detects the riding action of the bicycle rider to control the operation of a driving motor for driving the bicycle.

BACKGROUND OF THE INVENTION

Bicycles have been a widely used transportation means. Recently, due to the trend of environmental protection, bicycles have become more and more popular, especially in some urban areas. However, the bicycles are driven with human power which is not suitable for long distance transportation so that the travel distance of the-bicycles is very limited.

To overcome such a problem, electrical-motorized bicycles that are selectively driven by electrical motors are developed, which usually comprise an electrical motor mechanically coupled to one of the bicycle wheels to drive the wheel. A manual control is mounted on the handle or a position that can be reached by the rider to control the operation of the motor. A disadvantage associated with such a conventional configuration of the motorized bicycle is that upon turning on or off the motor, there is a sudden and significant change of the torque applied to the wheel by the motor. The rider may not be able to react so quickly as to follow the sudden change of torque, especially for children or the elder. Accidents may thus be caused.

Another disadvantage of the conventional design of electrical-motorized bicycle is that the operation efficiency of the electrical motor is low, because of the poor controllability of the motor. For example, once the bicycle has to be immediately stopped in an emergency, the rider may not be able to brake the bicycle while at the same time turn off the motor. Thus, the motor keeps on applying torque to the wheel while the rider is trying to stop the bicycle. This often causes accidents.

It is therefore desirable to provide a motorized bicycle driving motor control system which allows a rider to control the operation of the motor by means of the riding action so that such drawbacks that are encountered in the prior art may be overcome and eliminated.

SUMMARY OF THE INVENTION

It is an object of the present invention to provide a motor control system of electrical-motorized bicycle which allows the motor to be operated in response to the riding action of the rider so that no sudden application or cease of motor torque applied to the bicycle and thus enhance the controllability and the power efficiency of the motor of the electrical-motorized bicycle.

It is another object of the present invention to provide a motor control system of electrical-motorized bicycle wherein the electrical motor is continuously operating when the bicycle wheel is kept rotating to move the bicycle forward.

It is a further object of the present invention to provide a motor control system of electrical-motorize bicycle which stops the operation of the motor once the bicycle is stopped.

It is yet a further object of the present invention to provide a motor control system of electrical-motorized bicycle which prevents the motor from applying a forward torque to the bicycle wheel when the pedals are rotated in a reverse direction to enhance the operational safety of the motorized bicycle.

In accordance with the present invention, to achieve the above objects, there is provided a motor control system for use in an electrical-motorized bicycle, wherein the motor control system comprises a plurality of magnets arranged in a ring which is rotatable about the crank axle of the bicycle by the rotation of the chainwheel. A cover member is rotatably fit over the ring of the magnets and fixed to the bicycle frame. At least two sensors are arranged on the cover member to detect the rotational speed and direction of the magnet and thus generating a signal to indicate the change of the rotational speed and direction of the chainwheel for controlling the operation of an electrical motor that is mechanically coupled to and drives the bicycle wheel so that only when the chainwheel is rotated in the direction to drive the bicycle forward, the motor is actuated to drive the bicycle wheel. Once the chainwheel stops, the motor is turned off and no torque is applied to the bicycle wheel.

The features and advantages of the present invention will be readily understood from the following description of a preferred embodiment, reference being had to the attached drawings, wherein:

DETAILED DESCRIPTION OF THE PREFERRED EMBODIMENT

Figure 1:
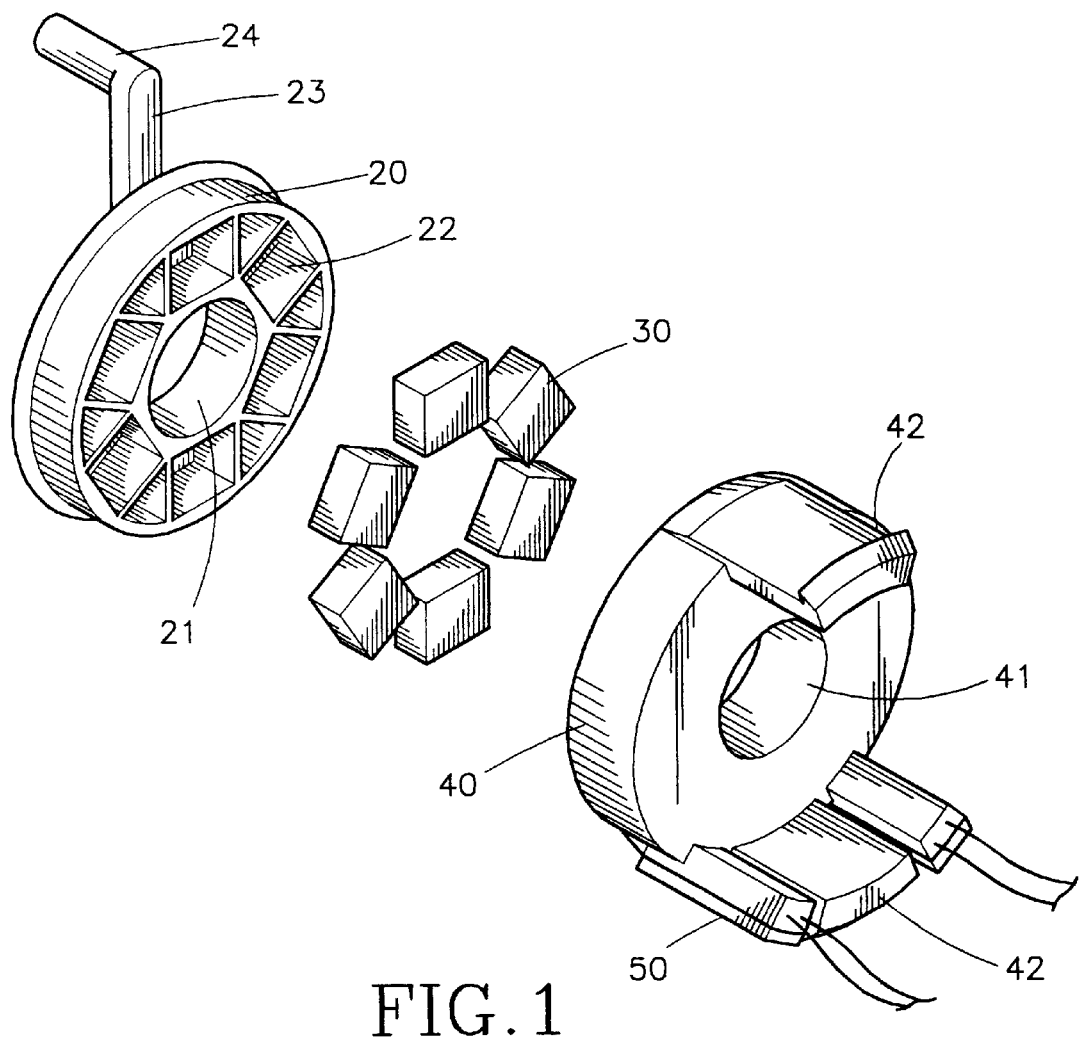
FIG. 1 is an exploded perspective view showing a motor control system of motorized bicycle constructed in accordance with the present invention.
Figure 2:
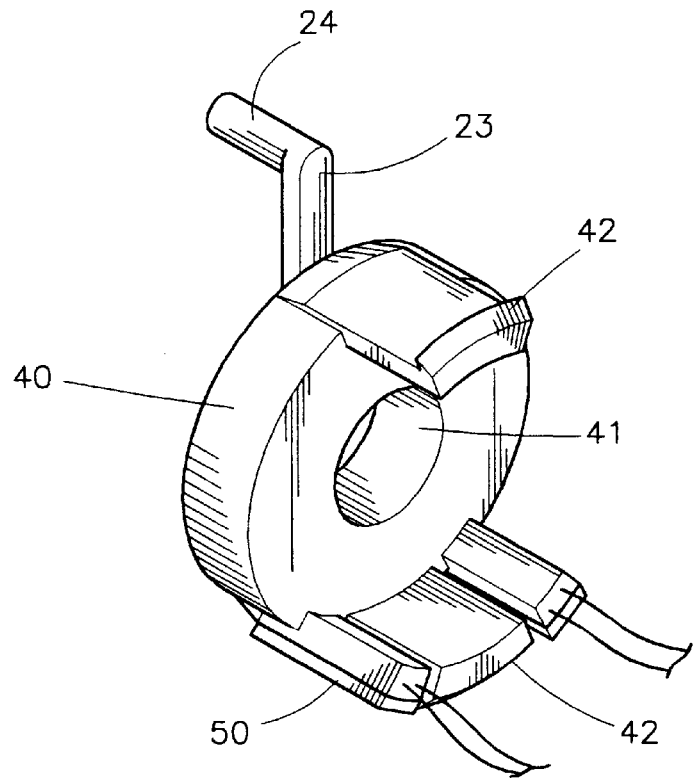
FIG. 2 is a perspective view showing the motor control system of motorized bicycle in accordance with the present invention.

With reference to the drawings and in particular to FIGS. 1 and 2, wherein a riding actuating motor control system for controlling a motor of a motorized bicycle in accordance with the present invention is illustrated, the motor control of the present invention comprises a magnet holder disk 20 having a central bore 21 with a plurality of magnet chambers 22 that are formed on a front face of the holder disk 20 disposed around the central bore 21, preferably in a substantially angularly equally spaced manner. A magnet 30 is received and fixed within each of the magnet chambers 22 in such a manner to have the magnet poles thereof directing outward in order to have the rotation thereof detected by sensors 50 to be described hereinafter.

In accordance with the present invention, of the magnets 30 are rotatable with a rotating member of the chain drive system of the bicycle so that when the rotation of the magnets 30 is detected by the sensor 50, the sensor 50 generates a signal indicating the rotation of the rotating member of the chain drive system. This indicates that the rider is riding the bicycle. This signal may then be used to control the operation of the electrical motor of the bicycle in any known manner.

Figure 4:
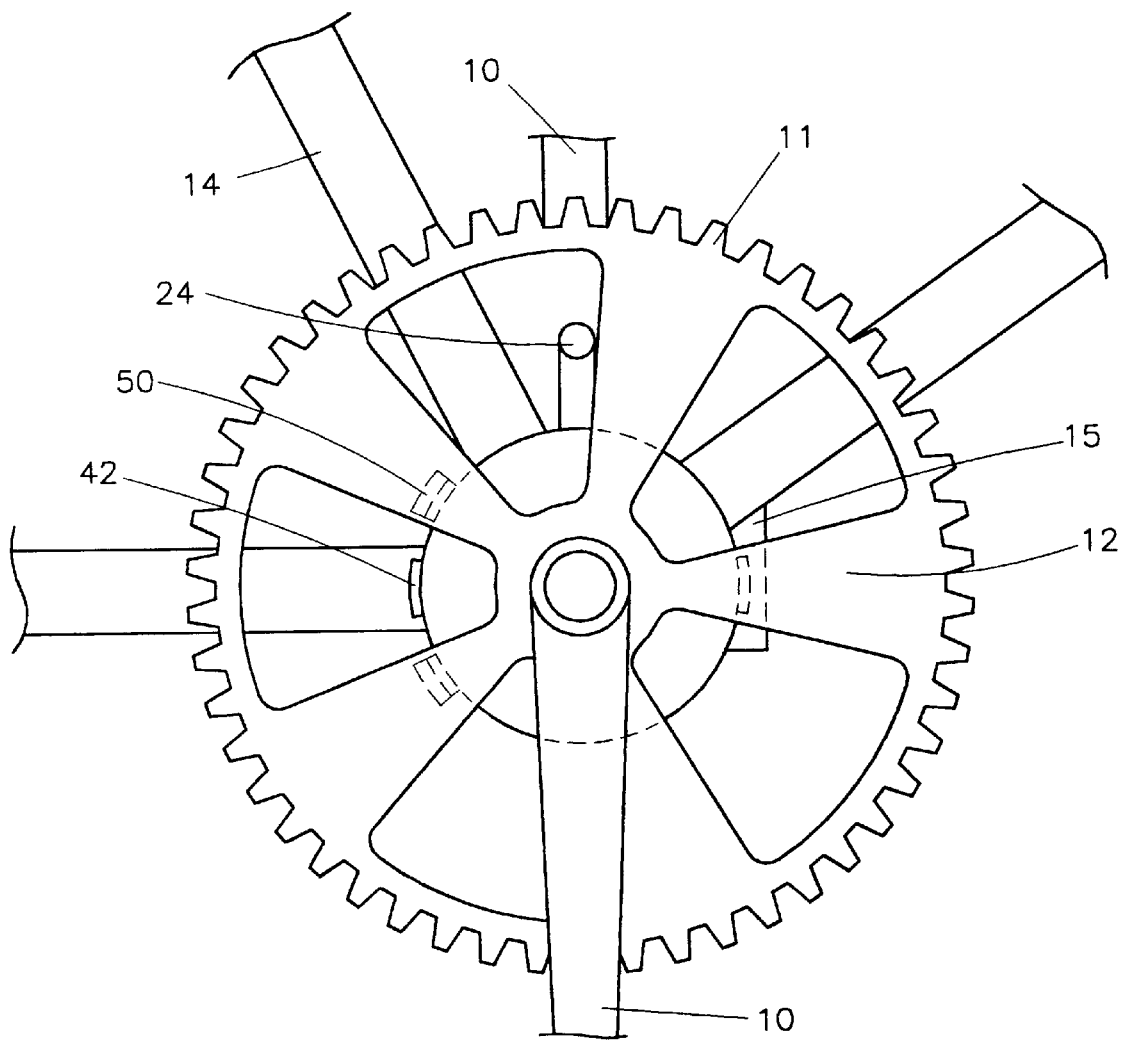
FIG. 4 is a side elevational view showing the motor control system of the present invention mounted to the bicycle frame.
Figure 5:
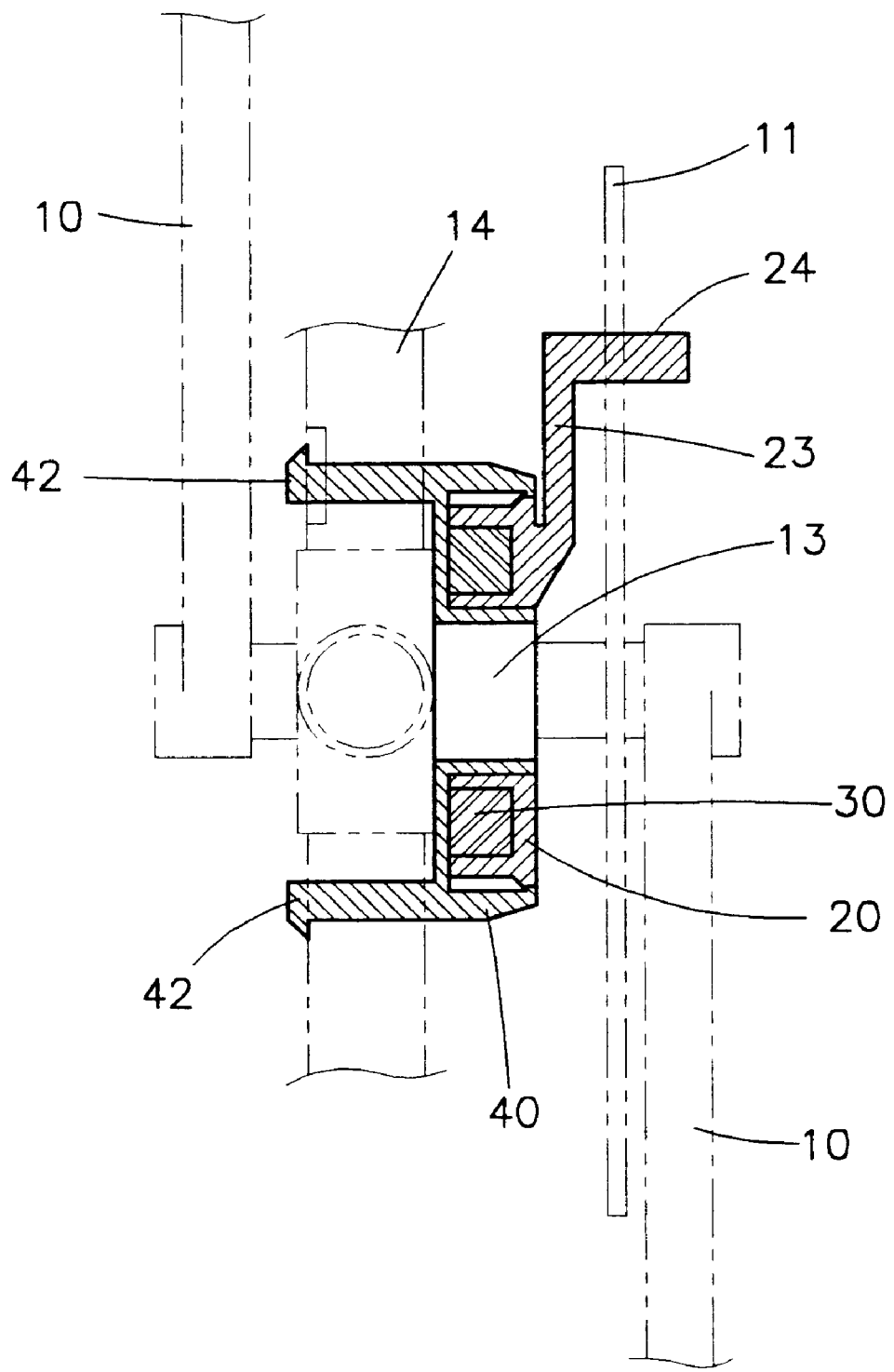
FIG. 5 is a cross-sectional view of the motor control system of the present invention, the bicycle frame being shown with phantom lines to illustrate relationship between the motor control system and the bicycle frame.

The rotating member may be the chainwheel of the bicycle as illustrated in FIGS. 4 and 5. Alternatively, it may be the derailleur gear cluster.

In the embodiment illustrated, a driving arm 23 is fixed to a rear face of the holder disk 20 and extending radially to define a free end. A coupling rod 24 extends from the free end of the driving arm 23 and runs into a spacing between two adjacent ribs 12 of the chainwheel 11 of the bicycle to be driven by riding action of a rider so as to rotate the magnet holder disk 20, see FIGS. 4 and 5, with the chainwheel 11.

A cover member 40 is configured to fit on the magnet holder disk 20. As shown in FIG. 5, the cover member 40 is a hollow donut-like member having a ring space defined by a cylindrical inner wall and a cylindrical outer wall that are concentric with each other to receive the magnet holder disk 20 therein with the inner wall thereof fit into the central bore 21 of the magnet holder disk 20 in a relatively rotatable manner. Thus, the magnet holder disk 20 is rotatable with respect to the cover member 40.

The inner wall of the cover member 40 defines a central bore 41 of the cover member 40 which is rotatably fit over a crank axle 13 of the bicycle, see FIG. 5. The outer wall of the cover member 40 comprises two axial extensions 42 each having a paw-like end. The outer wall of the cover member 40 comprises at least one sensor 50 fixed thereto. In the embodiment illustrated, there are two sensors 50 located adjacent to and on two circumferential sides of one of the axial extensions 42. The sensors 50 control the output torque of the bicycle motor with suitable circuits which may be any known circuits.

By disposing the magnets 30 into the magnet chambers 22 of the magnet holder disk 20 and then fitting the cover member 40 onto the magnet holder disk 20, a riding actuating motor control system of motorized bicycle in accordance with the preferred embodiment of the present invention is formed as shown in FIG. 2.

Figure 3:
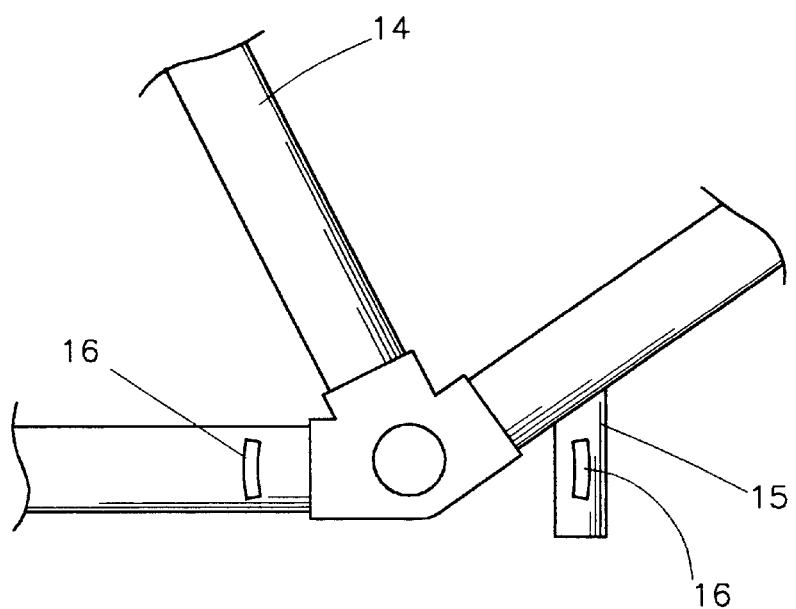
FIG. 3 is a side elevational view showing a portion of a frame of the motorized bicycle to which supports for supporting the motor control system of the present invention are fixed.

In FIG. 3, a portion of a frame 14 of the motorized bicycle is shown to which a pair of pedal cranks 10 (FIGS. 4 and 5) are rotatably attached. A support member 15 is mounted at a suitable position on the bicycle frame 14 (which is the down tube of the bicycle frame in the embodiment illustrated) and extending outward therefrom with a slot 16 formed thereon. A further slot 16 is formed at a suitable position on the bicycle frame 14 (which is the chain stay of the bicycle frame in the embodiment illustrated) to be opposite to the previous slot 16. The slots 16 are arranged so as to respectively receive and retain the paw-like ends of the axial extensions 42 of the cover member 40 so as to support the cover member 40 to the bicycle frame 14.

By mounting the motor control system of the present invention to the bicycle frame as described above, when a rider drives the bicycle by rotating the pedal cranks 10, a torque is applied to the chainwheel 11 to rotate it which in turn rotates the magnet holder disk 20 through the coupling rod 24 which extends into between two adjacent ribs 12 of the chainwheel 11. Since the cover member 40 is fixed to the bicycle frame, the magnet holder disk 20 rotates relative to the cover member 40. With such a relative rotation, the sensors 50 detect the speed change of the magnets 30 that are retained in the magnet holder disk 20. By such a detection, a control of the voltage or current applied to a motor may be achieved by any known electrical circuits so as to regulate the torque output of the motor of the motorized bicycle that is supplied to the bicycle wheel.

The sensors 50 may be any known kinds of magnetically operated devices, such as reed switching elements or Hall swtiches, or sensors of other type, such as infrared sensor. Preferably, there are at least two such sensors spaced from each other and mounted at suitable angular positions relative to the magnets 30 so that it is capable to detect the rotation direction of the chainwheel. Namely, the detection sequence of the two sensors is the first sensor first and then the second sensor when the chainwheel is rotated in a direction to drive the bicycle forward. Thus, when the detection sequence is as above, then the motor is actuated, otherwise (namely, the sequence is reversed) the motor will not be actuated in order to provide the bicycle with a regular driving operation.

Using two spaced sensors to determine the rotation direction is known and thus no detail will be given.

The above description is made with respect to a preferred embodiment of the present invention and for those skilled in the art, it is possible to made modifications and changes to the above-described embodiment without departing from the scope and spirit of the present invention. For example, the magnets 30 may be arranged on one side of the chainwheel and the sensors 50 are located on the opposite side the chainwheel. Alternatively, the magnets 30 may be attached to the derailleur gear cluster of a bicycle and the sensors 50 arranged at suitable location to sense the speed and direction of the rotation of the derailleur. All these modifications and changes should be considered within the scope of the present invention as defined in the appended claims.

What is claimed is:

1. A motor control system adapted to be used in an electrical-motorized bicycle, the motor control system comprising a plurality of magnets arranged in a ring rotatable with a rotating member of a chain drive system of the bicycle and at least one sensor mounted to a fixed frame of the bicycle and located at a position to detect the rotation of the magnets that are attached to the rotating member of the chain drive system to generate a signal indicating the rotation of the chainwheel for controlling the electrical-motorized bicycle.

2. The motor control system as claimed in claim 1, wherein the motor control system comprises at least two sensors spaced from each other and arranged at suitable angular positions relative to the ring of the magnets so as to detect the rotation of the ring of magnets.

3. The motor control system as claimed in claim 1, wherein the rotating member of the chain drive system comprises a chainwheel driven by pedal cranks to rotate about a crank axle.

4. The motor control system as claimed in claim 3, wherein the motor control system comprises a magnet holder disk having a plurality of magnet chambers formed on a front face and arranged to a ring surrounding a central bore, each of the chambers having one of the magnets received and retained therein, a driving arm attached to a rear face of the magnet holder disk and extending radially to define a free end to which a coupling rod is fixed and extending therefrom into between two adjacent ribs of the chainwheel so as to be rotatably driven by rotation of the chainwheel, a cover member having a ring space defined by an inner cylindrical wall and an outer cylindrical wall that are substantially concentric with each other for rotatably fitting over the ring of the magnets, the inner wall defining a central bore received within the central bore of the magnet holder disk and rotatably fit over the crank axle of the chainwheel, the cover member comprising two paw-like extensions provided on the outer wall to engage two support slots formed on the bicycle frame so as to fix the cover member to the bicycle frame, the sensor being attached to the outer wall of the cover member.

* * * * *